United States Patent
Boudebiza et al.

(10) Patent No.: US 9,903,230 B2
(45) Date of Patent: Feb. 27, 2018

(54) DEVICE FOR SECURING AND RETAINING AT LEAST ONE ELECTRICAL HARNESS IN A TURBOMACHINE

(71) Applicant: SNECMA, Paris (FR)

(72) Inventors: Tewfik Boudebiza, Moissy Cramayel (FR); Michel Henri Ziegler, Moissy Cramayel (FR); Guillaume Marcillaud, Moissy Cramayel (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 14/763,385

(22) PCT Filed: Jan. 21, 2014

(86) PCT No.: PCT/FR2014/050107
§ 371 (c)(1),
(2) Date: Jul. 24, 2015

(87) PCT Pub. No.: WO2014/114869
PCT Pub. Date: Jul. 31, 2014

(65) Prior Publication Data
US 2015/0361830 A1    Dec. 17, 2015

(30) Foreign Application Priority Data

Jan. 24, 2013   (FR) ..................... 13 50614

(51) Int. Cl.
*F16L 3/08*   (2006.01)
*F01D 25/28*   (2006.01)
(Continued)

(52) U.S. Cl.
CPC ............ *F01D 25/28* (2013.01); *B65D 63/04* (2013.01); *B65D 63/10* (2013.01); *F01D 25/00* (2013.01);
(Continued)

(58) Field of Classification Search
CPC ..... F16L 3/24; F16L 3/14; F16L 3/233; F16L 3/137; F16L 3/085; Y10T 24/1457; H02G 3/22; H02G 7/08
(Continued)

(56) References Cited

U.S. PATENT DOCUMENTS

| 375,945 | A | * | 1/1888 | McDonald | .............. E05B 75/00 |
| | | | | | 70/16 |
| 2,462,442 | A | * | 2/1949 | Wallace | .................. A47G 33/04 |
| | | | | | 248/538 |

(Continued)

FOREIGN PATENT DOCUMENTS

| EP | 2 437 365 A1 | 4/2012 |
| FR | 2 856 772 A1 | 12/2004 |

(Continued)

OTHER PUBLICATIONS

International Preliminary Report on Patentability and the Written Opinion of the International Searching Authority as issued in International Patent Application No. PCT/FR2014/050107, dated Jul. 28, 2015.

(Continued)

*Primary Examiner* — Kimberly Wood
(74) *Attorney, Agent, or Firm* — Pillsbury Winthrop Shaw Pittman LLP

(57) ABSTRACT

The device for securing and retaining at least one electrical harness in a turbomachine includes: at least one hollow profiled element that extends in one direction and has at least two slots of approximately the same dimension and; a clamping element intended to retain the at least one harness in position in a manner parallel to the hollow profiled element. The clamping element includes: a touch-and-close tape designed to cooperate with the width of the slots so as to allow it to pass on both sides of the profiled element and; an end stop secured to the tape, the end stop preventing the (Continued)

tape from passing through one of the slots in the profiled element.

9 Claims, 3 Drawing Sheets

(51) Int. Cl.
    *F01D 25/00*    (2006.01)
    *F02C 7/00*    (2006.01)
    *H02G 3/32*    (2006.01)
    *B65D 63/04*    (2006.01)
    *B65D 63/10*    (2006.01)
    *F16B 1/00*    (2006.01)
    *H01B 7/00*    (2006.01)

(52) U.S. Cl.
    CPC .................. *F02C 7/00* (2013.01); *F16B 1/00* (2013.01); *H01B 7/0045* (2013.01); *H02G 3/32* (2013.01); *F05D 2220/30* (2013.01); *F05D 2260/30* (2013.01); *F16B 2001/0028* (2013.01); *Y10T 24/14* (2015.01); *Y10T 24/1457* (2015.01)

(58) Field of Classification Search
    USPC ............ 248/68.1, 74.4, 56, 61, 62, 65, 74.3; 24/16 PB, 16 R
    See application file for complete search history.

(56) References Cited

U.S. PATENT DOCUMENTS

| | | | | |
|---|---|---|---|---|
| 2,595,857 A * | 5/1952 | Kinsel | ...................... | H02G 7/08 174/135 |
| 3,632,069 A * | 1/1972 | Thayer | ...................... | H02G 3/32 248/56 |
| 3,632,071 A * | 1/1972 | Cameron | .................. | F16L 3/08 24/16 PB |
| 3,633,857 A * | 1/1972 | Logan | ...................... | F16L 3/14 24/269 |
| 3,668,744 A * | 6/1972 | Moody | .................. | B65D 67/02 24/23 B |
| 4,182,005 A * | 1/1980 | Harrington | ........ | B65D 63/1072 24/16 PB |
| 4,289,288 A | 9/1981 | Gransberry et al. | | |
| 4,369,944 A * | 1/1983 | Hobart, Jr. | ............. | H02G 3/065 248/56 |
| 4,395,009 A * | 7/1983 | Bormke | .................. | H02G 3/32 174/157 |
| 4,397,436 A * | 8/1983 | Lyon | ........................ | F16L 3/233 24/269 |
| 4,663,496 A * | 5/1987 | Peek, Jr. | .................. | H02G 7/14 174/41 |
| 4,779,828 A * | 10/1988 | Munch | ...................... | H02G 3/32 24/16 PB |
| 4,893,381 A * | 1/1990 | Frankel | .................. | A44B 18/00 24/16 R |
| 4,909,051 A * | 3/1990 | Lee | ........................ | E05B 75/00 128/878 |
| 4,963,410 A * | 10/1990 | Bryant | .................. | A44B 18/00 24/16 R |
| 5,020,706 A * | 6/1991 | Birch | ........................ | B62J 9/02 224/424 |
| 5,048,158 A * | 9/1991 | Koerner | ................. | A44B 18/00 24/16 PB |
| 5,083,346 A * | 1/1992 | Orton | ........................ | F16B 2/08 24/16 PB |
| 5,167,050 A * | 12/1992 | Korsen | .................. | A44B 18/00 24/16 R |
| 5,332,179 A * | 7/1994 | Kuffel | ..................... | F16L 3/233 24/16 R |
| 5,395,018 A * | 3/1995 | Studdiford | ............... | B62H 5/00 224/420 |
| 5,568,905 A * | 10/1996 | Smith, II | ................... | B62J 6/18 248/230.8 |
| 5,598,995 A * | 2/1997 | Meuth | .................. | E21B 17/1035 24/273 |
| 5,604,961 A * | 2/1997 | Cole | ...................... | A44B 18/00 24/306 |
| 5,673,889 A * | 10/1997 | DeValcourt | ............... | B60R 9/08 224/319 |
| 5,699,642 A * | 12/1997 | McDevitt, Jr. | .......... | E04C 5/162 24/16 PB |
| 5,739,468 A * | 4/1998 | Rossman | ................. | H02G 3/22 174/153 G |
| 5,833,188 A * | 11/1998 | Studdiford | ............... | B62J 11/02 248/229.17 |
| 5,901,756 A * | 5/1999 | Goodrich | ................ | F16L 3/233 138/110 |
| 5,921,517 A * | 7/1999 | Meuth | ..................... | F16L 3/137 24/68 PP |
| 6,195,846 B1 * | 3/2001 | Studdiford | ............. | A44B 18/00 24/16 R |
| 6,278,831 B1 * | 8/2001 | Henderson | ........... | G02B 6/4473 385/100 |
| 7,185,399 B2 * | 3/2007 | Logan | ..................... | F16L 3/233 24/16 PB |
| 7,191,988 B2 * | 3/2007 | Kim | ........................ | F16L 3/085 248/229.2 |
| 7,854,414 B2 * | 12/2010 | Head | ..................... | F16L 3/233 24/20 R |
| 8,020,811 B2 * | 9/2011 | Nelson | ................. | F16L 3/2235 174/68.1 |
| 8,870,138 B2 * | 10/2014 | Maguire | .................. | B62J 11/00 24/269 |
| 9,067,717 B2 * | 6/2015 | DeMik | .................. | B65D 67/02 |
| 2002/0043592 A1 * | 4/2002 | Frazier | ................. | B65H 75/366 248/68.1 |
| 2005/0129375 A1 * | 6/2005 | Elkins, II | ............. | G02B 6/4472 385/100 |
| 2012/0210541 A1 * | 8/2012 | Koncelik, Jr. | ..... | B65D 63/1018 24/21 |
| 2015/0075132 A1 * | 3/2015 | Kohn | ...................... | B64D 29/08 60/39.08 |

FOREIGN PATENT DOCUMENTS

FR    2 950 662 A1    4/2011
FR    2 966 651 A1    4/2012

OTHER PUBLICATIONS

International Search Report as issued in International Patent Application No. PCT/FR2014/050107, dated Jul. 22, 2014.

* cited by examiner

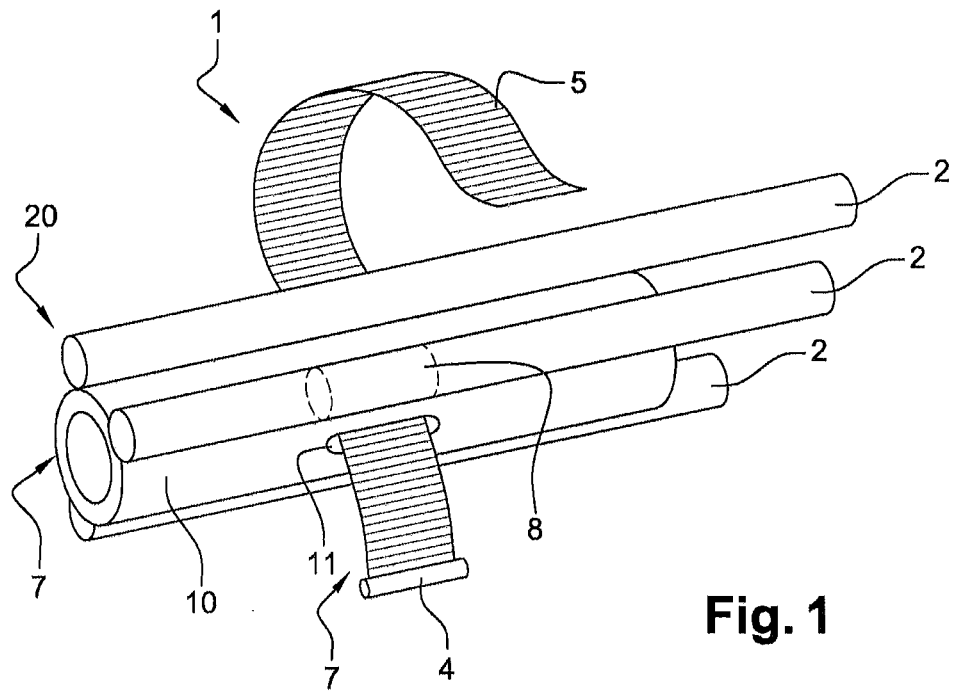
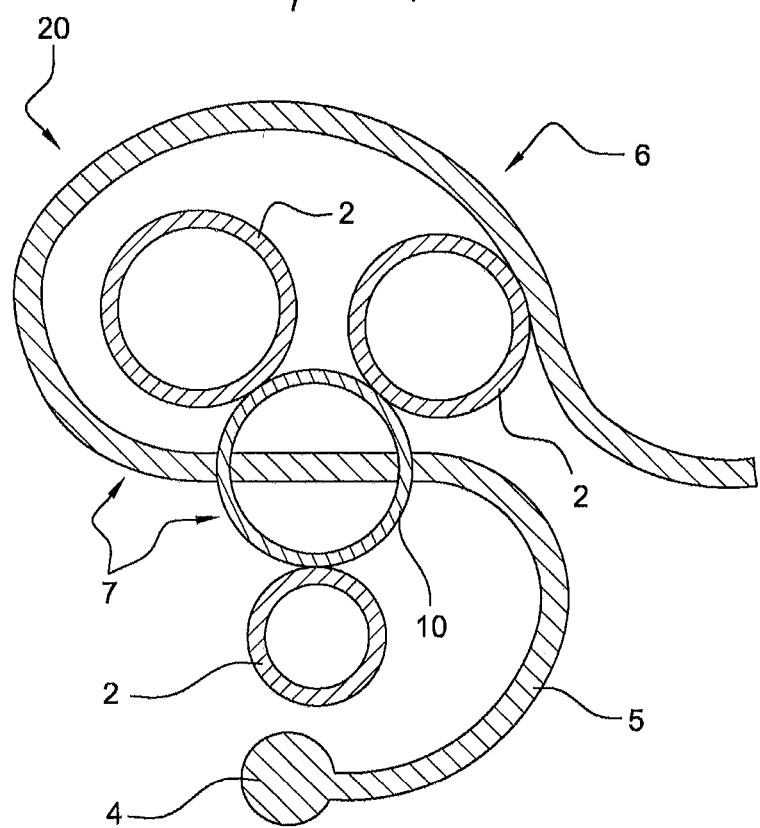
Fig. 1
Fig. 2

DEVICE FOR SECURING AND RETAINING AT LEAST ONE ELECTRICAL HARNESS IN A TURBOMACHINE

CROSS-REFERENCE TO RELATED APPLICATIONS

This is the U.S. National Stage of PCT/FR2014/050107, filed Jan. 21, 2014, which in turn claims priority to French Patent Application No. 1350614, filed Jan. 24, 2013, the entire contents of all applications are incorporated herein by reference in their entireties.

FIELD

The present invention relates to the technical field of devices for securing a plurality of tubes or wires which are to be extended within a given area. More specifically, the field of the invention relates to securing harnesses in turbojet applications subjected to high mechanical stresses.

STATE OF THE ART

Devices for securing electrical harnesses exist, particularly such as those described in application FR2856772, which describes a device for installing and retaining electrical harnesses on a turbojet.

This device enables a plurality of harnesses positioned on the periphery of a turbojet to be held in place. One disadvantage of this solution is that the device does not allow for flexible use, for example when it is desired to add a harness. This device also requires that the harnesses used have dimensions which comply with a standard.

A final disadvantage is the requirement to manage an additional item of mechanical equipment, such as a batten, which must be secured to the periphery of the turbojet.

There also exist devices, such as those described in application FR2950662, which enable an electrical harness to be secured to a turbomachine casing. This element enables the clamping diameter to be adapted to the diameter of the harness by a heat-shrinkable portion. However, this latter device has disadvantages. In particular it also makes it difficult to keep a plurality of harnesses retained together. In addition, while maintaining these parts, or when adjusting their positioning on the turbomachine, this device does not provide all the required flexibility of usage, since removal requires the clamping portion to be replaced.

There is also another solution to retain and secure harnesses on the periphery of a turbomachine described in document FR2966651. This solution includes an accessory which is secured on the periphery of the turbomachine, and which comprises a plurality of clips enabling electrical harnesses to be held in place. This solution requires a tightened assembly, and leaves little margin for manoeuvre in terms of the positioning of the different parts. It is also, like the previous solutions, inflexible if, for example, a harness is to be added. Finally, this solution has disadvantages when, for maintenance, the parts must be removed.

There are solutions using a silicon block enabling the harnesses to be held in place. However, this solution has the disadvantage that a specific mould must be created for each silicon block, and also a system for closing the blocks. One disadvantage is that this solution leads to a high mass and cost.

The solutions of the prior art all have the disadvantage that there must be a specific retaining point for each harness, for example a quadrant or a clip. In addition, for each harness, it is necessary to ensure that several specific retaining points are present at different places of the harness.

Each solution of the prior art involves the presence of an element, such as a quadrant or clip, which must be appropriate for a standard harness size. However, it is not always possible to obtain such elements, implying that there will be deformations, flapping or retaining elements which are unsuitable for the dimensions of the harness. As consequence, premature wear and tear can occur in the harnesses.

ABSTRACT OF THE INVENTION

The invention enables the above-mentioned disadvantages to be resolved.

One object of the invention relates to a device for securing and retaining at least one electrical harness in a turbomachine. The device includes:
 at least one hollow profiled element extending in a direction and including at least two slots of roughly the same dimension, and;
 a clamping element intended to hold in position the said at least one harness parallel to the hollow profiled element, The clamping element also includes:
 a touch-and-close tape adjusted to cooperate with the width of the slots such that it can pass either side of the profiled element, and;
 an end stop coupled to the tape, where the said end stop enables its passage through one of the slots of the profiled element to be blocked.

One advantage of the invention is that it reduces the number of the harnesses' securing points. The touch-and-close tape allows contact over a large area, which is an area where the tape overlaps on itself when it is wound around the profiled element and the harnesses.

Advantageously, the end stop is positioned at one end of the touch-and-close tape.

One advantage is that the end stop enables the tape to be held in place at one end. As a consequence, it constitutes a support point, particularly to facilitate clamping when winding the tape around the profiled element and the harnesses.

Advantageously, the touch-and-close tape is made of a metal or composite type material. One advantage is that the retaining force allows securing without any play, and without flapping, whilst allowing retention which prevents wear and tear to the harnesses. Advantageously, the profiled element is a cylindrical tube. This configuration is easy to manufacture and inexpensive. It allows symmetry with regard to the position of the harnesses around the tube, and to enable the load held in place to be balanced.

Advantageously, both slots are positioned such that they are in diametrically opposite positions, and roughly facing one another. This configuration enables the tape to be passed easily from one slot to the other without having to use a tool which must be inserted in the tube to guide the clamping element. This configuration also enables the clamping forces to be distributed in terms of the tape's contacts with the edges of the slot. By this means the tape is subjected to less wear and tear, and exerts less mechanical force on to the profiled element.

Another object of the invention relates to a fastening system including a securing and retaining device including at least one harness which is secured and retained by winding the touch-and-close tape around the profiled element, and at least one harness. Winding is accomplished such that a first face of the tape is in contact with the second face of the said tape.

One advantage is that the overlapping surface of the touch-and-close tape can be adjusted, and therefore that the retaining force can be increased. In a specific configuration, the overlapping surface is extended to one complete revolution.

Advantageously, at least one harness is covered with a heat-shrinkable sheath. This sheath enables the harnesses to be protected, in particular where the clamping device overlaps.

Another object of the invention relates to a turbomachine including:
- a pipe secured to the said turbomachine and;
- a device for securing and retaining the invention, where the clamping element enables the said at least one harness to be held in position, and where the profiled element and pipe are securely coupled to one another.

BRIEF DESCRIPTION OF THE FIGURES

Other characteristics and advantages of the invention will be seen clearly on reading the detailed description below, with reference to the appended figures, which illustrate:

FIG. 1: a perspective view of the device of the invention;

FIG. 2: a section view of the device of the invention in an open position;

DESCRIPTION

Figure 3:
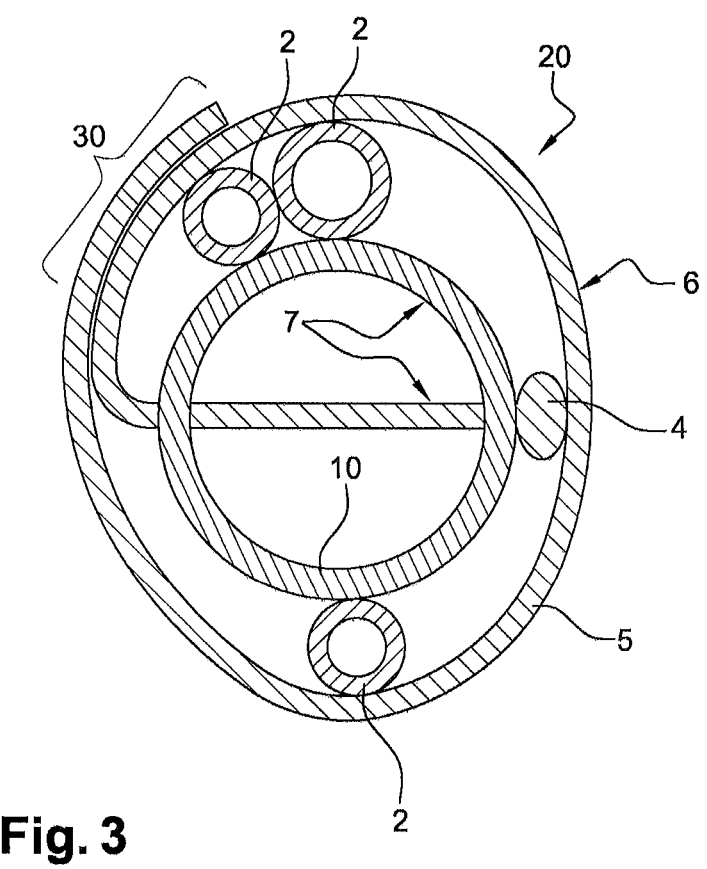
FIG. 3: a section view of the device of the invention in a closed position.

In the remainder of the description the term "profiled element" means a mechanical element extending in one direction and having a constant section.

In the present description a "regular profiled element" is the name given to a tube and a "non-regular profiled element" is the name given to every other element extending in a dimension which is not a tube.

An example of a touch-and-close tape is more widely known by the name "Velcro", which is a registered trademark. The term "Velcro" is used in day-to-day language as a generic name to designate a textile material. It consists of two tapes each covered with a different texture which, when brought into contact, enable a removable bond to be obtained rapidly.

FIG. 1 represents device 7 for securing and retaining the invention including tube 10 and a clamping element 1. The clamping element includes a tape 5 and an end stop 4.

FIG. 1 also represents fastening system 20 of the invention including securing and retaining device 7, and also harnesses 2. Harnesses 2 are thus retained by device 7. Securing device 7 can be used to couple together securely the harnesses, a profiled element and a pipe 41, where the said pipe 41 is secured to a turbomachine 40.

Indeed, the pipes 41 are secured to the turbomachine 40 and have the advantages of that they are tubular in shape and are rigid. They therefore provide satisfactory support for the harnesses. Securing and retaining device 7 is therefore particularly well-suited for securing the harnesses and the profiled element to a pipe 41 of a turbomachine 40.

In the case of a flexible pipe 41, the securing and retaining device may also be used to secure the harnesses to this pipe 41.

When different pipes 41 are attached along the length of the turbomachine 40, securing and retaining devices 7 can be distributed along different pipes 41 so as to route different groups of harnesses.

According to one example embodiment, the profiled element is a regular profiled element, such as a tube 10. According to other variants, the profiled element can have an oval, rectangular, square or lozenge-shaped section. For example, a lozenge-shaped type of profiled element may have the advantage that it provides four support surfaces for harnesses 2, whilst limiting the possibility of one harness becoming entangled with another.

The case in which profiled element 10 has a circular section enables relative configuration flexibility to be obtained to position harnesses 2 all the way around the circumference of tube 10.

According to one embodiment, tube 10 is hollow so as to lighten the general support structure of harness 2. Depending on the embodiments, the diameter of tube 10 and its thickness may be chosen so as to meet a need to route harnesses 2 over a given distance, whilst providing support giving a ratio between desired dimensions, an acceptable limiting mass, and a given resistance.

Profiled element 10 may be locally deformable, depending on its thickness, its shape and/or the mechanical stresses applied to it. In general, a deformable profiled element will be chosen which is metal and hollow, for example. The rigidity of the material of profiled element 10 is chosen in accordance with the desired configuration, such as, for example, a mass of harness which must be retained. The choice of a deformable material enables certain configurations of harness fasteners to be adapted along the length of the profiled element with regard, for example, to saving space.

In the example of FIG. 1 there are three harnesses 2 positioned around tube 10.

Tube 10 has two slots 11, a single one of which is represented in the perspective view of FIG. 1. Both slots are designed to allow a tape to pass through them. They are preferably identical.

The securing and retaining device of the invention includes a clamping element 1 which comprises a tape 5 and an end stop 4.

Tape 5 is designed so that it may pass freely through slots 11 of tube 10. Only a single slot 11 is represented in FIG. 1. According to one embodiment, the width of tape 5 is slightly less than the width of slots 11, and its thickness is slightly less than the thickness of slots 11; in this case it is adjusted to match the dimensions of slots 11. In this latter configuration, the clamping forces exerted by clamping element 1 on tube 10 are optimised from the standpoint of their distribution along tube 10. There is then less wear and tear of clamping element 1.

Since tape 5 is introduced into both slots 11, it can be fully introduced, such that end stop 4 is pressed against slot 11. End stop 4 advantageously has dimensions greater than the slot intended to retain end stop 4, called the "retaining slot". Interchangeably when the slots are identical, the retaining slot is chosen arbitrarily; it is the one through which the tape is introduced.

According to one embodiment, if a slot 11 is specially intended to be the retaining slot, mechanical reinforcement elements can be installed on tube 10 around the said retaining slot, such that end stop 4 is pressing against the reinforcement elements, rather than against tube 10. This embodiment is not represented in FIG. 1.

According to one configuration, the width of end stop 4 is greater than that of retaining slot 11. In addition, its thickness may be greater than that of retaining slot 11. By this means, end stop 4 exerts an optimised reaction on to the tube all around slot 11.

According to one embodiment, end stop 4 has a contact surface which cooperates locally with the shape of the tube. In this case the surface of the end stop intended to be in contact with the tube is slightly curved.

FIG. 2 represents a section view perpendicular to the longitudinal axis along which tube 10 and harnesses 2 extend.

Device 7 is said to be "in an open position". In this example corresponding to the configuration of FIG. 1 there are three harnesses 2 which are positioned around tube 10. The harnesses can be of different diameters. Tape 5 can thus be chosen to have a certain length whereby the harnesses can be covered.

The length of the tape can be chosen so as to allow a certain adaptability for changes of configuration, such as the case in which a harness is added in fastening system 20.

FIG. 3 represents a section view perpendicular to the longitudinal axis along which tube 10 and harnesses 2 extend.

Device 7 is said to be "in a closed position". Clamping element 1 is wound around tube 10 and harnesses 2.

The tape has two surfaces, an upper surface and a lower surface. The tape's upper surface and lower surface are designed to cooperate, so as to cause a removable contact when pressed against one another.

A second portion of tape 5 covers, in a zone 30, also called the overlapping surface, a first portion of tape 5. The two portions are located at different parts of the tape. They are in general found at both ends of tape 5, such that they can be in contact after the tape has been wound around tube 10 and harnesses 2.

According to one embodiment, the tape is fully touch-and-close along its entire length. According to one variant, it is touch-and-close only over one of the portions of its surface.

According to the embodiments, the touch-and-close tape can be a composite or metal touch-and-close tape.

Where the goal is to retain and route electrical harnesses for turbojets, fastening system 20 includes a hollow cylindrical tube 10 or hollow profiled element. The different harnesses 2 are positioned around this tube 10. Two through slots 11, which are diametrically opposed on tube 10, act as a passageway for the metal or composite touch-and-close tape. This tape 5, with end stop 4, helps implement a retaining function, and they assist fastening system 20 in implementing a function of positioning and locking the electrical harnesses relative to tube 10.

Figure 4B:
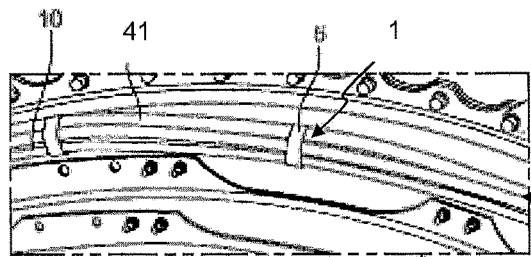
FIG. 4b: a zoom of FIG. 4b.
Figure 4A:
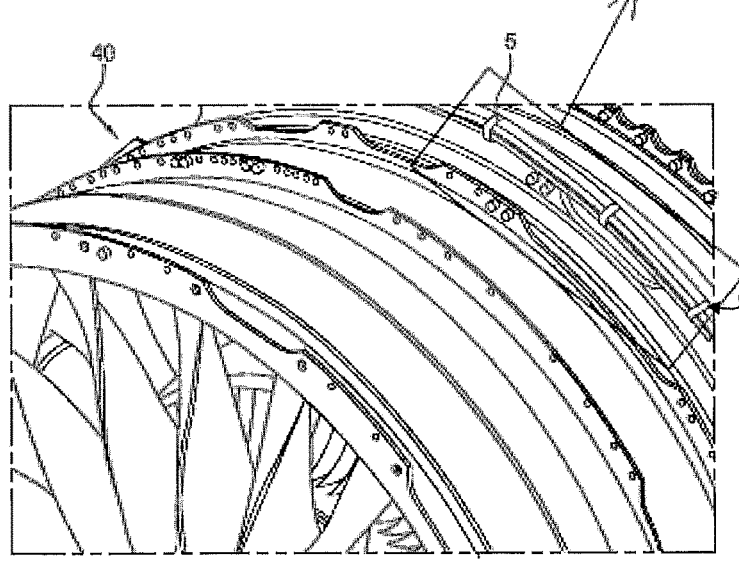
FIG. 4a: a perspective view of a part of the turbomachine of the invention.
Figure 5:
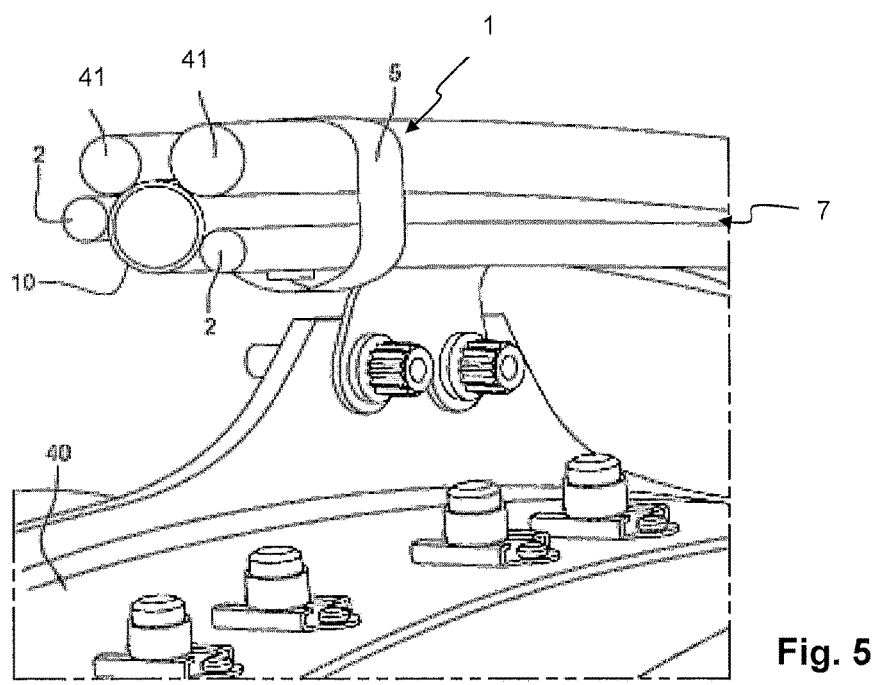
FIG. 5: a section view of the device of the invention represented in FIGS. 4a et 4b.

The invention also relates to a turbomachine 40 represented in FIGS. 4a, 4b and 5 which includes an hydraulic circuit having a plurality of pipes 41. As can be seen from FIGS. 4a to 5, the turbomachine 40 includes:
at least one pipe 41 secured to the turbomachine 40,
one securing and retaining device 7 of the invention,
at least one harness 2.
The clamping element 1 enables the at least one harness 2, the profiled element 10 and the pipe 41 to be securely coupled to one another. Fastening system 1 of the invention is suitable to be installed along the pipes 41.

The invention has the following advantages:

There is a smaller number of attachments on a harness. Indeed, it is no longer necessary to have quadrants, clips or silicon blocks.

Improved clamping, since flapping is reduced or eliminated.

Improved "clipping" of the harness.

Improved guidance of the harness by means of the tube, which acts as a rail connected to the engine, in particular, at very few points. There are therefore fewer brackets, and installation and maintenance are therefore easier.

A reduced risk of errors relating to the choice of sizes of standards which were required with the quadrants, clips and silicon blocks.

The invention claimed is:

1. A device for securing and retaining at least one electrical harness in a turbomachine, including:
at least one hollow profiled element extending in a direction and including at least two slots of roughly the same dimensions, said at least one hollow profiled element being a cylindrical tube, and;
a clamping element intended to hold in position the at least one harness parallel to the hollow profiled element, said at least one harness to be positioned around a circumference and on an outer surface of the cylindrical tube, which provides a support surface for said at least one harness,
wherein said clamping element includes
a touch-and-close tape adjusted to cooperate with a width of the at least two slots such that the touch-and-close tape is passable either side of the profiled element, the touch-and-close tape including a first face intended to be in contact with a second face of the touch-and-close tape when said at least one electrical harness is held in position by the clamping element, and;
an end stop coupled to the touch-and-close tape and to be pressed against one of the at least two slots, where the end stop has dimensions greater than said one of the at least two slots so that a passage of the end stop through said one of the at least two slots of the profiled element is blocked.

2. The device according to claim 1, wherein the end stop is positioned at one of the ends of the touch-and-close tape.

3. The device according to claim 1, wherein the touch-and-close tape is made of a metal type material.

4. The device according to claim 1, wherein the touch-and-close tape is made of a composite type material.

5. The device according to claim 1, wherein the at least two slots are positioned such that the at least two slots are diametrically opposite, and roughly facing one another.

6. A fastening system including a device according to claim 1 and at least one harness, wherein the at least one harness is secured and retained by winding the touch-and-close tape around the profiled element and the harness such that a first face of the touch-and-close tape is in contact with a second face of the touch-and-close tape.

7. The fastening system according to claim 6, wherein the at least one harness is covered with a heat-shrinkable sheath.

8. A turbomachine including at least one pipe secured to the turbomachine, and a device according to claim 1, where the clamping element enables the at least one harness, the profiled element and the at least one pipe to be securely coupled to one another.

9. The device according to claim 1, wherein the stop is arranged to be pressed against said one of the at least two slots on the outer surface of the tube by said touch and close tape in order to hold in position the at least one harness parallel to the tube.

\* \* \* \* \*